United States Patent [19]

Guerra

[11] 4,249,397
[45] Feb. 10, 1981

[54] CLUTCH CONSTRUCTION FOR CAPPING MACHINE QUILL ASSEMBLY

[75] Inventor: Frank J. Guerra, East Islip, N.Y.

[73] Assignee: Resina Automatic Machinery Co. Inc., Brooklyn, N.Y.

[21] Appl. No.: 41,015

[22] Filed: May 21, 1979

[51] Int. Cl.³ .............................................. F16D 7/00
[52] U.S. Cl. ...................................... 64/29; 64/30 R; 53/331.5
[58] Field of Search ....................... 64/30 R, 30 C, 29; 53/331.5, 317; 192/56 R

[56] References Cited

U.S. PATENT DOCUMENTS

| | | | |
|---|---|---|---|
| 2,983,121 | 5/1961 | Naas | 64/29 |
| 3,214,887 | 11/1965 | Weller | 53/316 |
| 3,303,633 | 2/1967 | Wilhere | 53/317 |
| 3,429,407 | 2/1969 | Orwin et al. | 64/29 |
| 3,435,587 | 4/1969 | Weller | 53/317 |
| 3,613,751 | 10/1971 | Juhasz | 192/56 R |

FOREIGN PATENT DOCUMENTS 162796  5/1921  United Kingdom .................. 192/56 R Primary Examiner—Ira S. Lazarus
Assistant Examiner—Magdalen Moy
Attorney, Agent, or Firm—Charles E. Temko

[57] ABSTRACT

An improved clutch for use with an in-line capping machine quill assembly, permitting the driven friction wheel or disc to slip upon the occurrence of excessive torque. As contrasted with prior art constructions, the friction disc which contacts the caps during a seating operation does not form part of the clutch. The clutch is positioned at the top of the quill assembly, and employs a pair of metallic plates adjustably tensioned by spring washers. Threaded means is provided for adjusting clutch pressure for slippage within a predetermined torque range.

2 Claims, 2 Drawing Figures

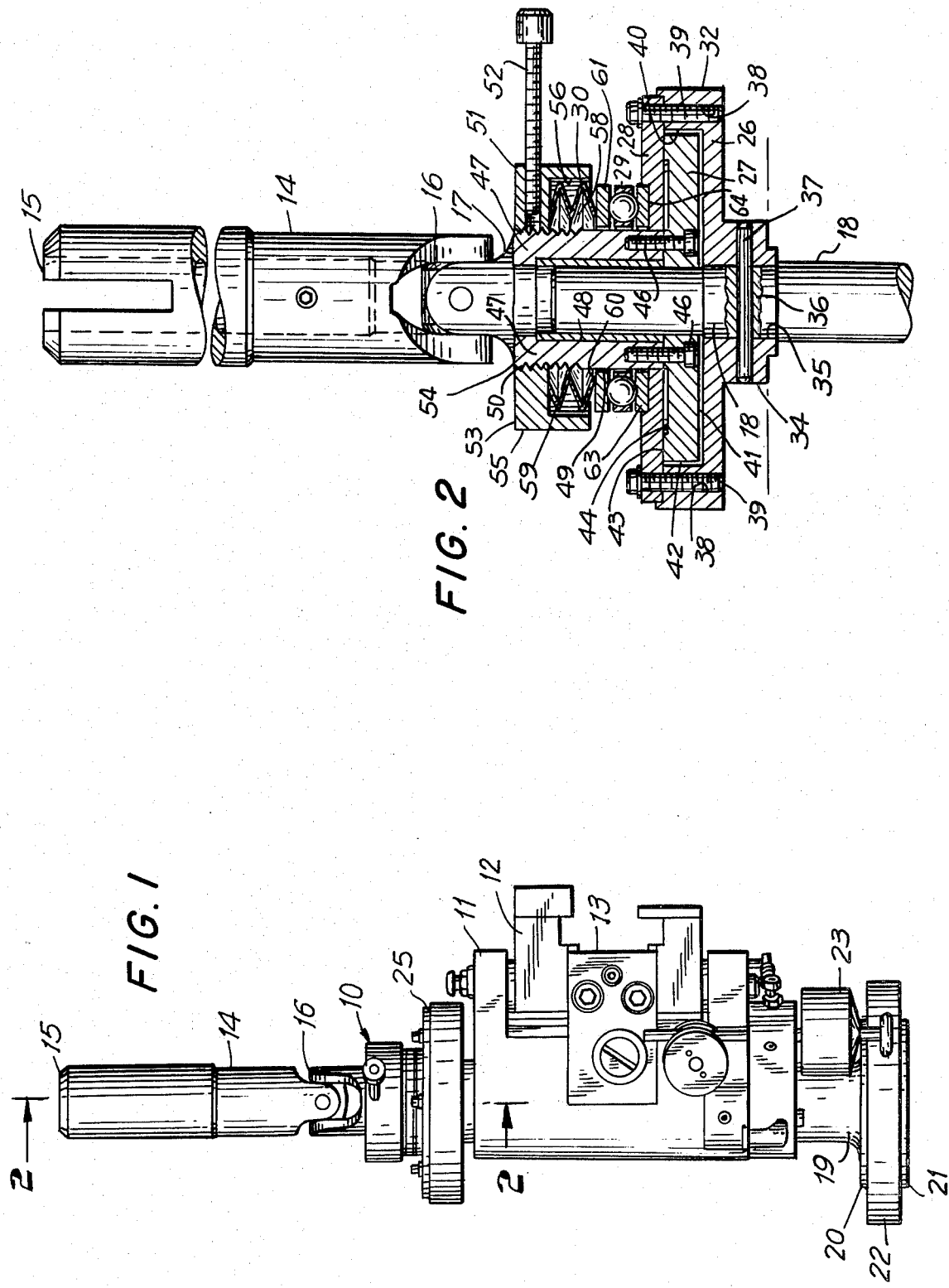

CLUTCH CONSTRUCTION FOR CAPPING MACHINE QUILL ASSEMBLY

BACKGROUND OF THE INVENTION

This invention relates generally to the field of so-called in-line capping machines adapted to seat and tighten successive caps exiting from a cap chute upon serially advancing containers having an upwardly facing neck forming an opening, and more particularly to an improved quill assembly incorporating a novel clutch construction which permits the transmission of torque upon an engaged cap to be maintained within prescribed limits. Devices of this general type are known in the art, and the invention lies in specific constructional details which permit improved operation and ready manual adjustability required when the capping machine is used for installing a variety of caps upon a corresponding variety of containers. Reference is made to U.S. Pat. Nos. 3,214,887, dated Nov. 2, 1965; and 3,435,587 dated Apr. 1, 1969, both patents being granted to Arthur W. Weller, and assigned to the same assignee as the instant application, these patents disclosing the environs of the present invention. Cap applying machines of the disclosed type are characterized in including an endless conveyor belt which advances in serial fashion a plurality of open containers beneath a plurality of rotatively driven quill elements, half of which are disposed on either side of the containers at a height wherein a driven frictional wheel or disc will engage the cylindrical surfaces of an applied screw or bayonet type cap delivered to a point of engagement with a container, and rotated to tightened condition to thereby seal the contents of the container.

In the past, the degree of applied torque was not particularly critical. Most caps were fabricated from metal, and were not easily damaged. An excessively tightly fitted cap was manually removed with difficulty, but usually without damage either to it or the engaged container.

In more recent years, there has been a much greater use of screw-type caps formed from synthetic resinous materials, particularly in the area of "child-proof" caps which are formed to include an inner and an outer element normally turn free of each other in the absence of manually applied pressure along the axis of the cap, tending to bring the inner and outer elements into mutually engaged condition. The outer element is often a thin plastic shell which is easily cracked during the capping operation. This condition will escape notice at the time, and will in many cases prevent proper functioning of the cap at the time of subsequent manual removal. Where the crack is a peripheral one having an axis parallel to the axis of the cap, the sharp edges defining the crack form a safety hazard to the fingers of the user as well. While the application torque may be reduced under such conditions, too little torque, particularly where the contents of the containers are in liquid form, gives rise to the possibilities of leakage of the same before use.

The problem has been recognized in the prior art, and crude attempts at solution have been made. The most simple expedient is to clamp the driven friction disc at the bottom of the quill element under an adjustable pressure, such that the disc will slip under excessive applied torque. The shortcoming of this structure lies in the fact that effectively, one of the clutch "plates" is of highly resilient material, and static friction under load is too loosely related to the clamping pressure applied against the disc. Further, with continued slippage, the wear on the planar surface of the disc effectively changes the clamping pressure, whereby frequent adjustment is necessary to maintain a reasonably constant maximum available torque.

SUMMARY OF THE INVENTION

Briefly stated, the invention contemplates the provision of a readily accessible plate clutch for use in a device of the type described, in which the components are entirely of metallic construction, and in which convenient manual regulation is possible without disturbing the rubber cap-applying disc. Power is transmitted through a pair of coaxially aligned rotary members, one of said members being resiliently pressed against the other by a series of Belleville washers. Finely threaded adjustment means provides for the compression of the Belleville washers to be regulated within close limits. The frictionally engaged surfaces are positioned only at the peripheral areas of the rotating members so as to provide greater sensitivity to changes in transmitted torque.

BRIEF DESCRIPTION OF THE DRAWING

In the drawings, to which reference will be made in the specification, similar reference characters have been employed to designate corresponding parts throughout the several views.

FIG. 1 is a fragmentary side elevational view of an individual quill element embodying the invention.

FIG. 2 is a fragmentary view in elevation, partly in section, corresponding to the upper portion of FIG. 1.

DETAILED DESCRIPTION OF THE DISCLOSED EMBODIMENT

In accordance with the invention, the device, generally indicated by reference character 10, and commonly referred to in the art as a quill element, comprises: a relatively fixed vertical housing 11 secured to a mounting block 12 having an opening 13 for engaging a supporting rail (not shown) whereby the housing may be adjusted to accommodate for caps to be seated of varying diameters. Supported in the housing is a driven shaft element 14 having a spline connection 15 at an upper end thereof and a universal joint 16 at a lower end thereof. The joint interconnects with an upper enclosed shaft member 17 abutting a lower enclosed shaft member 18. The lower end 19 of the member 18 mounts upper and lower clamp members 20 and 21, respectively, supporting a drive friction disc 22 of rubber or other resilient material. Wear compensation means 23 contacts the outer surface of the disc 22. As the means 23 is fully described in the latter of the above-mentioned Weller patents, the details thereof need not be further considered herein.

Interconnecting the members 17 and 18 is a clutch element 25, including a clutch cup 26, a clutch plate 27, a thrust plate 28, a thrust bearing 29, and adjustable tensioning means 30.

The clutch cup 26 may be in the form of a machined casting, and includes an outer cylindrical wall 32, a radially extending wall 33, and a coaxially disposed downwardly extending sleeve 34 having a bore 35, engaging a portion 36 of a reduced diameter on the member 18 and secured thereon by a pin 37. The wall 32 is provided with a plurality of peripherally arranged bores 38 engaging cap screws 39 which loosely hold the thrust plate 29 thereon, and permit the plate to move upwardly or downwardly to a small degree for engagement with the clutch plate 27.

The clutch plate 27 is positioned within a recess 40 in the clutch cup 26, and is bounded by a lower surface 41, a peripheral edge surface 42, and an upper surface 43, a central area 44 of which is recessed to assure that clutch engagement will occur only at the peripheral areas. A plurality of medially disposed bores accommodate screws 46 which project upwardly to engage a sleeve 47, an innner surface 48 of which is lined with bearing material, and an outer surface 49 of which includes a threaded upper segment 50 engaging a large adjusting nut 51. A manually engageable member 52 projects outwardly from the nut to facilitate the making of small rotational increments for adjusting clutch tension. The nut 51 includes an upper wall 53 having a central threaded opening 54 and a cylindrical wall 55, the inner surface 56 of which cooperates with the lower surface 57 of the wall 53 to form a recess 58 for accommodating a plurality of Belleville washers 59.

The lowermost edge 60 on the lowest washer contacts the upper race 61 of a thrust bearing 62, the lower race 63 being disposed in a small recess 64 in the thrust plate 28.

From a consideration of FIG. 2, it will be apparent that with sufficient rotation of the nut 51, the washers 59 will be resiliently urged against the thrust bearing, which in turn pushes the thrust plate 28 into contact with the peripheral portion of the clutch plate 27. Assuming that the static friction existing therebetween is not exceeded, rotation imparted to the drive shaft element 14 will be transmitted to the disc 22. When excessive torque is encountered, the reaction will cause the clutch plate to slip with respect to the thrust plate, until such time as this torque is relieved. As the clutch plate is made of oil impregnated bronze, and the thrust plate of hardened tool steel, the clutch structure is substantially self-lubricating, and normally will require no service throughout its useful life. On the other hand, should servicing be necessary, it can be conveniently disassembled using only ordinary tools.

It will thus be apparent that I have invented novel and highly useful improved clutch means for use with in-line capping machine quill elements wherein there is provided a single means for accurately maintaining a predetermined range of permissible torque values during operation. The structure can be incorporated into existing capping machines with a minimum of modification, and at relatively low cost.

I wish it to be understood that I do not consider the invention limited to the precise details of structure shown and set forth in this specification, for obvious modifications will occur to those skilled in the art to which the invention pertains.

I claim:

1. In a capping machine quill assembly, including a relatively fixed housing having a throughbore, a drive shaft element positioned within said bore, a lower end of which mounts a friction wheel, and an upper end connected to a source of rotational motion, improved clutch means for preventing the transmission of torque above predetermined limits through said friction wheel, comprising: a first shaft member, a radially extending clutch plate mounted upon said first shaft member at one end thereof; a second shaft member, a radially extending clutch cup member having an arcuate contact surface solely at the periphery thereof, and mounted upon said second shaft member at an end thereof abutting said first mentioned end and defining a recess; said clutch plate being disposed within and substantially filling said recess; a radially extending thrust plate overlying said recess and secured at the periphery thereof to a peripheral surface of said cup member for limited axial movement relative thereto; a thrust bearing secured to said first shaft member and contacting an exposed surface of said thrust plate, and resilient tension means surrounding said first shaft member and pressing said thrust bearing against said thrust plate to bring it into contact with said clutch plate, whereby motion is transmitted from said first shaft member to said second shaft member when the static friction existing between said thrust plate and said clutch plate is not overcome.

2. Improved clutch means in accordance with claim 1, further characterized in said resilient means including a plurality of Belleville washers and a threaded adjusting nut overlying said washers and threadedly engaging said first shaft member.

* * * * *